US012546583B2

(12) United States Patent
Göhnermeier

(10) Patent No.: US 12,546,583 B2
(45) Date of Patent: Feb. 10, 2026

(54) PHOTOGRAMMETRIC CAMERA AND METHOD FOR THE TWO-DIMENSIONAL MEASUREMENT OF OBJECTS

(71) Applicant: Carl Zeiss Industrielle Messtechnik GmbH, Oberkochen (DE)

(72) Inventor: Aksel Göhnermeier, Essingen-Lauterburg (DE)

(73) Assignee: Carl Zeiss Meditec AG, Jena (DE)

( * ) Notice: Subject to any disclaimer, the term of this patent is extended or adjusted under 35 U.S.C. 154(b) by 120 days.

(21) Appl. No.: 18/216,552

(22) Filed: Jun. 29, 2023

(65) Prior Publication Data
US 2024/0003674 A1     Jan. 4, 2024

(30) Foreign Application Priority Data
Jun. 29, 2022    (DE) ......................... 10 2022 116 214

(51) Int. Cl.
*G01B 11/00*      (2006.01)
*G01B 11/02*      (2006.01)
(Continued)

(52) U.S. Cl.
CPC ............ *G01B 11/005* (2013.01); *G02B 13/22* (2013.01); *G02B 26/0833* (2013.01);
(Continued)

(58) Field of Classification Search
CPC ........... G06T 5/73; G01B 11/24; G01B 11/00; G01B 2210/54; G01B 21/045
See application file for complete search history.

(56) References Cited

U.S. PATENT DOCUMENTS 10,436,576 B2   10/2019   Minekawa et al.
2004/0165759 A1*   8/2004   Baldwin ............ G01N 21/8806
                                                           348/125
(Continued)

FOREIGN PATENT DOCUMENTS

DE    102013108457 A1 *   4/2014   ............. G01B 11/24
DE    102016202928 A1     8/2017
(Continued)

OTHER PUBLICATIONS

Jun Sik, Kim et al. "Multi-aperture Telecentric Lens for 3D Reconstruction", Optics Letters, Apr. 1, 2011, pp. 1050-1052, vol. 36, No. 7. Carnegie Mellon University, Pittsburgh, PA.
(Continued)

*Primary Examiner* — Tarifur R Chowdhury
*Assistant Examiner* — Kaitlyn E Kidwell
(74) *Attorney, Agent, or Firm* — Ewers IP Law PLLC; Falk Ewers

(57) ABSTRACT

A photogrammetric camera for the two-dimensional measurement of objects has a lens, an image sensor and a pupil filter configured as a micromirror, each of which is transferable into a first and second tilted position. An illumination system produces light. A micromirror in the first tilt position reflects light produced by the illumination system such that the light cannot reach the object while light reflected at the object is guided to the image sensor. Conversely, a micromirror in the second tilt position reflects light such that the light can reach the object while light reflected at the object is supplied to the image sensor. To implement a recording of an image with coaxial dark or coaxial reflected light illumination, the micromirror device is controlled such that the light produced by the illumination system is incident on the surface at different angles within an angular range of at least arcsin(NA).

8 Claims, 4 Drawing Sheets

(51) Int. Cl.
G02B 13/22 (2006.01)
G02B 26/08 (2006.01)
G03B 7/095 (2021.01)
G03B 9/02 (2021.01)
G03B 35/02 (2021.01)
H04N 23/12 (2023.01)
H04N 23/56 (2023.01)

(52) U.S. Cl.
CPC ............. *H04N 23/12* (2023.01); *H04N 23/56* (2023.01); *G01B 11/022* (2013.01); *G03B 7/095* (2013.01); *G03B 9/02* (2013.01); *G03B 35/02* (2013.01)

(56) References Cited

U.S. PATENT DOCUMENTS

| | | |
|---|---|---|
| 2006/0007436 A1 | 1/2006 | Kurosawa et al. |
| 2006/0033921 A1* | 2/2006 | Den Boef ............. G03F 9/7034 356/446 |
| 2008/0239316 A1 | 10/2008 | Gharib et al. |
| 2015/0146183 A1* | 5/2015 | Deguenther ........ G03F 7/70066 359/292 |
| 2016/0091422 A1* | 3/2016 | Van Der Zouw .. G01N 21/4738 356/445 |
| 2017/0248768 A1 | 8/2017 | Seitz et al. |
| 2018/0246415 A1* | 8/2018 | Xalter ................. G03F 7/70516 |
| 2020/0124407 A1* | 4/2020 | Haugen .................. G06T 7/521 |

FOREIGN PATENT DOCUMENTS

| | | |
|---|---|---|
| DE | 102021118327 A1 | 1/2023 |
| WO | 2015113724 A1 | 8/2015 |
| WO | 2015159641 A1 | 10/2015 |

OTHER PUBLICATIONS

R. H. Shepard et al. "Optical Design and Characterization of an Advanced Computational Imaging System", MIT Open Access Articles, http://dx.doi.org/10.1117/12.2060725, Sep. 19, 2014, Society of Photo-Optical Instrumentation Engineers, Massachusetts Institute of Technology.

Office Action issued in German Patent Application No. DE 10 2022 116 214.1, dated Sep. 12, 2023, (from which this application claims priority) and English language translation thereof.

* cited by examiner

PHOTOGRAMMETRIC CAMERA AND METHOD FOR THE TWO-DIMENSIONAL MEASUREMENT OF OBJECTS

CROSS REFERENCE TO RELATED APPLICATIONS

This application claims priority to German patent application DE 10 2022 116 214.1, filed Jun. 29, 2022, the entire content of which is incorporated herein by reference.

TECHNICAL FIELD

The disclosure relates to a photogrammetric camera and a method for the two-dimensional measurement of objects. Such photogrammetric cameras are used as contactless sensors in coordinate metrology and, for example, can be fastened to a coordinate measuring machine or can be securely installed in a coordinate measuring machine.

BACKGROUND

Coordinate measuring machines are used in the prior art for the purpose of measuring the geometry of workpieces and other objects. For example, such measurements are implemented within the scope of quality assurance or reverse engineering. As a rule, the measurement tasks, some of which are complex, are reduced to the measurement of the spatial coordinates of a number of individual points.

The coordinate measuring machines contain a sensor, the position of which relative to the workpiece to be measured is changeable with the aid of drives. Especially in the case of relatively small coordinate measuring machines, the workpiece is located on an X-Y table, which can be displaced along two horizontal coordinate axes x, y with great accuracy. As a rule, the sensor is attached to a quill, which can be displaced vertically (i.e., in the z-direction) with a similarly high level of accuracy. If the intention is to measure particularly large or heavy workpieces, then coordinate measuring machines with a gantry design are used, in which the workpiece is stationary and only the sensor is displaced.

With regard to the sensors for coordinate measuring machines, a distinction is made between optical and tactile sensors. Whereas the information relating to the position of a measurement point is generated by making contact with the measurement point using a probing element in the case of tactile sensors, the information relating to the position of the measurement point is captured by light in the case of optical sensors. With the optical sensors, it is frequently only possible to measure the coordinates of the workpiece in the focal plane of the sensors, and hence in two dimensions. If measurements are carried out successively in a plurality of focal planes, the spacing of which is known with great accuracy, then it is possible to measure the geometry of the workpiece—apart from undercuts and similar structures not identifiable by the optical sensor—in three dimensions.

Coordinate measuring machines having optical sensors are sold by the applicant, for example under the brand name ZEISS O-INSPECT, and are described in DE 10 2016 202 928 A1 which corresponds to US 2017/0248768 A.

Lenses for photogrammetric cameras which are telecentric on both sides, in the case of which a second off-axis aperture is provided in the pupil plane, which is frequently also referred to as aperture or stop plane, in addition to a first aperture on the optical axis, are known from an article entitled Multi-aperture Telecentric Lens for 3D Reconstruction by Jun-Sik-Kim and Takeo Kanade, OPTICS LETTERS, Vol. 36, No. 7, pp. 1050-1052, 1 Apr. 2011. In this way, it is possible to determine distance information between the camera and the object.

The option of being able to arrange different stops in the pupil plane, and hence obtain variable pupil filtering, is also used occasionally in other photogrammetric cameras. In this context, the different stop elements are usually accommodated in an automated interchange unit, which may be in the form of a turret mount, for example. However, the interchange units are mechanically complicated, require a lot of installation space and do not allow fast changes of the light distribution in the pupil plane.

US 2008/0239316 A1 describes a photometric camera which for the purpose of pupil filtering uses an LCD panel arranged in the pupil plane. Such panels require only little installation space and usually have a sub 5 µs switching speed. It is characteristic for LCD panels that the incident light is polarized. This is disadvantageous for certain applications and, moreover, is accompanied by intensity losses, which may lead to a lower signal-to-noise ratio on the image sensor and hence may lead to less accurate measurement results.

An article entitled Optical Design and Characterization of an Advanced Computational Imaging System by R. H. Shepard et al., Proc. SPIE 9216, Optics and Photonics for Information Processing VIII, 92160A (19 Sep. 2014) describes a test bench with a simultaneously pupil-encoded and time-encoded imager, which uses a DMD (Digital Mirror Device) for the purpose of pupil apodization or a deformable mirror for wavefront encoding experiments.

SUMMARY

It is an object of the disclosure to provide a photogrammetric camera for the two-dimensional measurement of workpieces and other objects, with which surfaces with different properties can be optimally measured.

The object is achieved by a photogrammetric camera for the two-dimensional measurement of objects, which has an object-side telecentric lens with a pupil plane, a two-dimensional image sensor and a variable pupil filter. The pupil filter includes a micromirror device arranged in the pupil plane and having a plurality of micromirrors, each of which is transferable into a first and into a second stable tilted position. The photogrammetric camera further includes an illumination system configured to produce light and, with the aid of the micromirror device, direct said light at the object to be measured. A control device of the photogrammetric camera is configured to control the micromirror device. A micromirror in the first tilt position reflects light produced by the illumination system so that said light cannot reach the object. By contrast, light reflected at the object is reflected by a micromirror in the first tilt position so that said light can reach the image sensor. A micromirror in the second tilt position reflects light produced by the illumination system so that said light can reach the object. By contrast, light reflected at the object is reflected by a micromirror in the second tilt position so that said light cannot reach the image sensor. To implement a recording of an image of the surface of the object with coaxial dark field illumination or coaxial reflected light illumination, the control device is configured to control the micromirror device in such a way that the light produced by the illumination system is incident on the surface of the object at different angles within an angular range of at least arcsin(NA)/10, wherein the angular range is between 70° and 90°.

Since the micromirror device is located both in the beam path of the light used for illumination purposes and in the beam path of the light reflected at the object, the illumination angle distribution for the illumination light and the pupil function (i.e., the light distribution in the pupil plane) for the reflected light are not adjustable independently of one another. For example, if the object is intended to be illuminated with axially parallel light, which requires an illumination of the pupil center, then the micromirrors arranged there must be in the second tilt position. In that case, it is not possible in the image plane to filter the light reflected at the object so that even axially parallel light is incident on the image sensor.

However, an exactly axially parallel illumination is generally already undesirable as this would lead to very low intensities.

However, according to an aspect of the disclosure, the coupling of the illumination angle distribution to the pupil function for the reflected light allows different illumination modes, to be precise a coaxial dark field illumination or a coaxial reflected light illumination in particular, to be set very easily and quickly. In a manner similar to microscopy, it is then possible to produce images of the surface in which the imaged structures are highlighted or suppressed in various ways in the recorded images. Since the micromirrors of the pupil filter can change their position very quickly, it is possible for the photogrammetric camera according to an aspect of the disclosure to switch between illumination modes within fractions of a second. As a result, it is possible to very quickly record a plurality of images of the surface, which differ in terms of the illumination mode set. For the actual evaluation, which is to say the determination of the dimensions of structures on the surface, it is then possible for example to use the most suitable image or else—if the best reproductions of different structures are in different images—a combination of a plurality of images. If the photogrammetric camera additionally obtains distance information by setting two different focal planes, it is possible to geometrically measure objects not only in two dimensions but in three dimensions.

A dark field illumination is distinguished in that no specular reflections contribute to the image creation, but only light that was diffusely scattered by the observed surface or diffracted at edges on the surface. In the case of dark field illumination, the observed object is normally only illuminated at flat angles and only the portion of the light scattered or diffracted in the direction of the lens is used for imaging purposes. In the case of such flat illumination, light specularly reflected at the observed surface either does not arrive at the lens at all or cannot be recorded by the numerical aperture NA of the lens because the angles are greater than $\arcsin(NA)$.

In the case of coaxial dark field illumination, the observed object is not illuminated at flat angles but at angles within the numerical aperture NA the lens. However, light specularly reflected at the surface is then able to enter the lens again. In this case, the tilt positions of the micromirrors ensure that this light cannot reach the image sensor. By way of example, dark field illumination is used in the case of very reflective surfaces which have only small elevations. The specular reflection would overexpose the image; only diffraction at the edges contributes in the dark field.

Coaxial reflected light illumination is related to coaxial dark field illumination inasmuch as, in that case too, the observed object is only illuminated at angles smaller than $\arcsin(NA)$. However, all the light reflected from the surface, which is to say both the diffusely and specularly reflected components, contributes to the image creation. By way of example, coaxial reflected light illumination can be used to be able to measure stepped blind holes. In this case, the illumination must be at angles which are as small as possible in order to be able to illuminate edges to be detected deep within a drilled hole.

There must be a sufficient number of micromirrors in the second tilt position in order to ensure that a sufficient quantity of the light is available for the illumination. This leads to the requirement of the produced light striking the surface not only perpendicularly or at any one other angle, but with different angles within an angular range. It was found that an angular range of $\arcsin(NA)/10$ enables a sufficiently large quantity of light. To obtain a coaxial dark field or reflected light illumination, this angular range must be between 70° and 90°, typically between 80° and 90°, and ideally include the angle of 90° as a boundary value.

In the case of lenses with a particularly large numerical aperture NA>0.35, the angular range should be increased accordingly. The lower limit value of 70° should then be replaced with $(90°-2*\arcsin(NA))$.

A further advantage of the photogrammetric camera according to an aspect of the disclosure is that the aforementioned illumination modes can be set quickly even if the normal of the surface to be measured is not parallel to the optical axis of the lens but at a (small) angle thereto. By shifting the tilt position distribution of the micromirrors, it is possible to displace the directional distribution of the illumination light almost continuously within certain boundaries. As a result, it is not necessary to resort to a tilting stage or a displacement of the photogrammetric camera for the purpose of aligning the object so that the surface normal runs parallel to the optical axis.

To avoid misunderstandings, attention is drawn to the fact that a photogrammetric camera is already covered by the scope of the disclosure if it is configured exclusively to record an image using coaxial dark field illumination or exclusively to record an image using coaxial reflected light illumination. In other words, a photogrammetric camera according to an aspect of the disclosure need not be able to provide both illumination modes, even if this is preferred.

The disclosure exploits the frequently unwanted property of commercially available micromirror devices that the micromirrors do not have a stable tilt position in which all the surfaces of the micromirrors are arranged in a common plane. The sawtooth-like surface structure, as known from a Fresnel mirror, present in both tilt positions however offers advantages to the photogrammetric camera according to an aspect of the disclosure since illumination light coming from one direction is directed at the object and the light reflected at the object is supplied to the image sensor if it is incident on tilt mirrors in the other tilt position.

The illumination system typically includes a light source and an illumination optical unit which images the light source onto the micromirror device. However, if the light source is a point light source, then only a very small region is illuminated in full in the pupil plane, leading to a very targeted, which is to say axial, illumination. It is therefore typical for the light source to be a surface emitter with a Lambertian emission characteristic so that the object to be measured can be illuminated uniformly from different directions. The emission characteristic of the surface emitter and the focal length of the illumination optical unit should be chosen so that the light which is incident on the surface of the object can at least have angles in the desired angular range of at least $\arcsin(NA)/10$.

If the intention is to record an image with coaxial dark field illumination, then the micromirror device can be controlled in such way that all micromirrors within a first region in the pupil plane are in the second tilt position and all micromirrors within a second region surrounding the first region are in the second tilt position, with the first region being at least substantially point symmetric. This ensures that light specularly reflected at the surface is incident on micromirrors which are likewise in the second tilt position. This light returns to the illumination system and consequently cannot contribute to the creation of an image, as is desirable in the case of dark field illumination.

If the surface to be measured is aligned perpendicular to the optical axis, then the first region should be point symmetric with respect to the optical axis. By contrast, the point of symmetry is away from the optical axis in the case of inclined surfaces.

If the first region at least substantially has the shape of a circular disc (it is not possible to realize any geometrically exact shape on account of the subdivision of the pupil filter into individual micromirrors), then a surface to be measured is illuminated uniformly from different directions, with the maximum angle relative to the surface being defined by the diameter of the circular disc. If the surface is oriented at an angle, then the circular disc should be arranged off centered in relation to the optical axis. It may be advantageous in the case of specifically structured surfaces to exclude individual illumination directions, or weight these to be weaker. In that case, the first region may then have the shape of, for example, an ellipse or two point-symmetrically arranged circle segments, which each extend over angles of between 50° and 170°, for example.

To the extent that reference is made here and hereinbelow of "all" micromirrors being in a specific tilted position, this should be understood to the effect that individual micromirrors (e.g., defective micromirrors) may also be in the respectively "incorrect" tilt position since isolated errors in the illumination angle distribution are not noticeable in the recorded image. However, it should not be the case that more than 2% of the respective micromirrors are in the "incorrect" tilt position.

If the intention is to record an image with coaxial reflected light illumination, then the micromirror device can be controlled in such a way that all micromirrors within a first region in the pupil plane are in the second tilt position and all micromirrors within a second region surrounding the first region are in the second tilt position, with the first region not being point symmetric. This ensures that light specularly reflected at the surface is incident on micromirrors which are in the first tilt position. This light reaches the image sensor and consequently contributes to the creation of an image, as is desirable in the case of reflected light illumination.

For example, the first region can have the shape of a circular disc segment. The surface to be measured is then illuminated from a plurality of directions using a quasi-continuous angle spectrum, with the maximum angle relative to the surface being defined by the radius of the circular disc segment.

If the image is recorded with a non-point-symmetric first region, then there may be an undesired image offset which is the consequence of the non-telecentric illumination angle distribution. To record an image with coaxial reflected light illumination, it is therefore typical if the control device is configured to control the micromirror device in such a way that different first regions are produced successively at different locations in the pupil plane. In the ideal case, these different first regions complement one another in such a way that a point symmetric overall region and hence a telecentric illumination angle distribution are obtained while the image is recorded. Since the micromirrors can be repositioned within fractions of a second, it is possible to successively set a plurality of different pupil functions even during the exposure of an individual frame, even in the case of a short exposure time.

For example, if a circular disc-shaped overall region is desirable, then it is possible to produce k different first regions in succession, which each have the shape of circular disc segments with a respective angular range of 360/k°. These different first regions are oriented so that they add up to a complete circular disc.

To enable a compact structure, it is generally expedient for the photogrammetric camera to have a deflection mirror arranged in the light path between the micromirror device and the image sensor. The deflection mirror is typically planar but may in principle also have an imaging function. In view of advantageous beam folding without shadowing effects, it may be expedient for the micromirrors to be arranged in an assembly plane which extends at an inclination with respect to a sensor plane in which the image sensor extends.

It is not only in the context of a coaxial reflected light illumination that it may be advantageous to have the control device successively produce different first regions at different locations in the pupil plane for the purpose of recording the image of the surface of the object. The option of very quickly producing different distributions of tilt positions of the micromirrors can also be used to obtain images in which a plurality of illumination types, for example a coaxial reflected light illumination and a coaxial dark field illumination, are combined. In this case, any desired weighting between coaxial reflected light illumination and dark field illumination can be set within wide boundaries.

The subject matter of the disclosure also includes a method for the two-dimensional measurement of objects using a photogrammetric camera including an object-side telecentric lens which has a pupil plane and images a surface of the object onto an image sensor, a variable pupil filter which includes a micromirror device arranged in the pupil plane and having a plurality of micromirrors, each of which is transferable into a first and into a second stable tilted position, and an illumination system which produces light and directs the latter at the object with the aid of the micromirror device. A micromirror in the first tilt position reflects light produced by the illumination system such that the light cannot reach the object and reflects light reflected at the object such that the light can reach the image sensor. A micromirror in the second tilt position reflects light produced by the illumination system such that the light can reach the object and reflects light reflected at the object such that the light cannot reach the image sensor. The method includes the following steps:

a) light is produced and directed at the object with the aid of the micromirror device,
b) to implement a recording of an image with coaxial dark field illumination or coaxial reflected light illumination, the micromirror device is controlled so that the light produced by the illumination system is incident on the surface at different angles within an angular range of at least arcsin(NA)/10, wherein the angular range is between 70° and 90°,
c) an image of the surface of the object recorded by the image sensor is stored, and
d) dimensions of structures on the surface are calculated on the basis of the stored image of the surface.

The exemplary embodiments explained at the outset apply analogously to the method.

Further, the subject matter of the disclosure includes a computer program product having a computer program which includes program code for controlling the method according to an aspect of the disclosure reproduced above when the computer program is executed on a computer.

BRIEF DESCRIPTION OF THE DRAWINGS

The disclosure will now be described with reference to the drawings wherein.

DESCRIPTION OF EXEMPLARY EMBODIMENTS

1. Structure of the Coordinate Measuring Machine.

Figure 1:
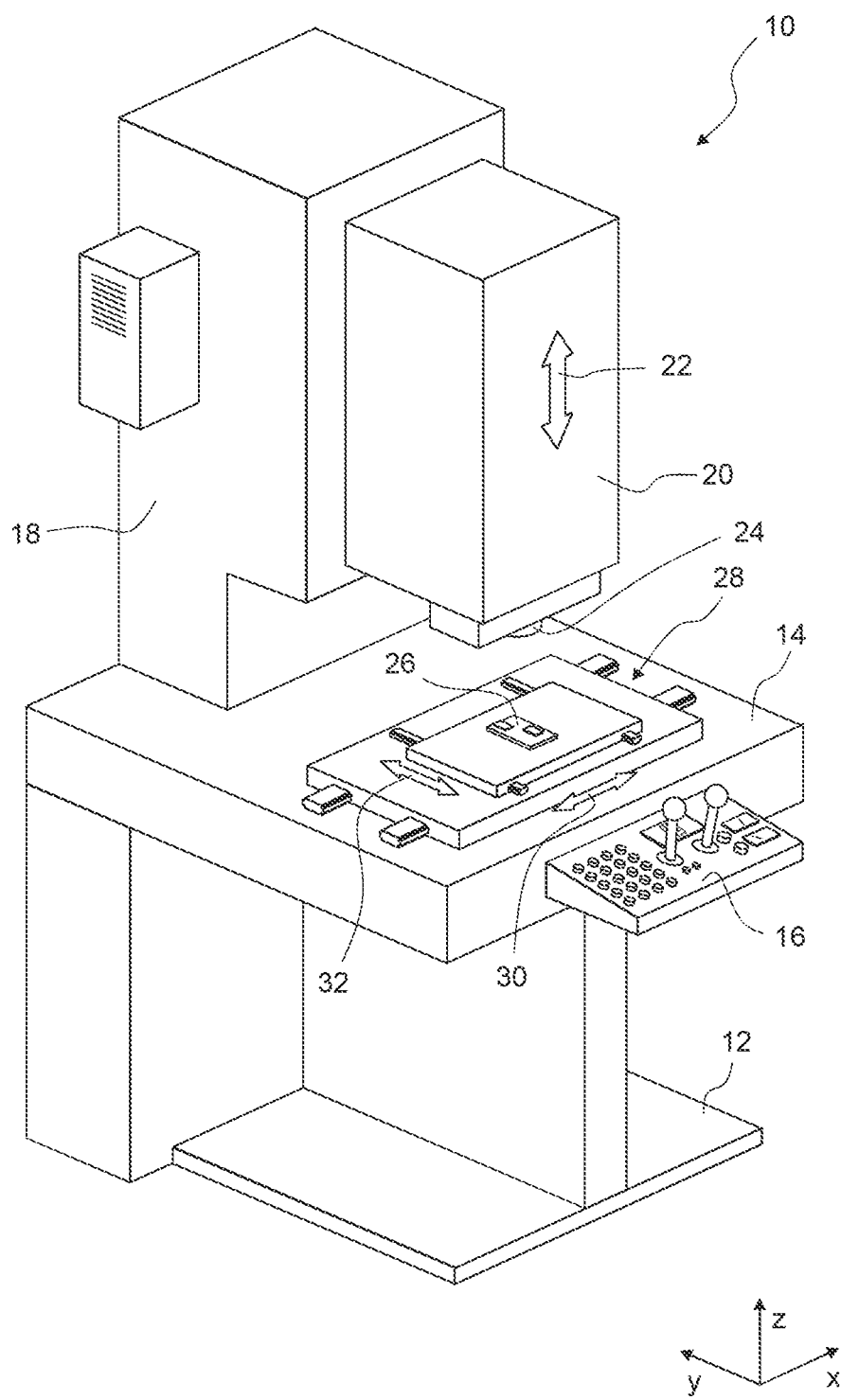
FIG. 1 shows a schematic perspective illustration of a coordinate measuring machine and having a photogrammetric camera according to an exemplary embodiment of the disclosure.

FIG. 1 shows a schematic perspective illustration of a coordinate measuring machine, which is denoted by reference numeral 10.

The coordinate measuring machine 10 includes a base 12 that carries a table 14 on which a control panel 16 is fastened. Starting at the table 14, there is an upwardly extending stand 18 that carries a quill 20. As indicated by an arrow 22, the quill 20 is precisely displaceable in the vertical direction (z-direction) with the aid of a drive (not depicted here).

An optical sensor 24 which can be used to record an image of the workpiece 26 is fastened to the lower side of the quill 20. The workpiece 26 is fastened to an X-Y table 28, with which the workpiece 26 can be precisely displaced in the horizontal plane (x-direction and y-direction), as is indicated in FIG. 1 by arrows 30 and 32. This allows even relatively large workpieces 26 to be measured successively with the aid of the sensor 24 by virtue of the workpiece 26 being incrementally introduced into the measurement field of the sensor 24 with the aid of the X-Y table 28.

If the intention is to measure even larger or particularly heavy workpieces 26, then the coordinate measuring machine 10 may also have a different structure and for example include a movable portal, to which the quill 20 is fastened, instead of the X-Y table 28. In this way, the quill can be precisely displaced not only in the z-direction but also in the x-direction and y-direction, as is known per se from the prior art. Then there is no need to move the workpiece 26 during the measurement.

2. Structure of the Sensor

Figure 2:
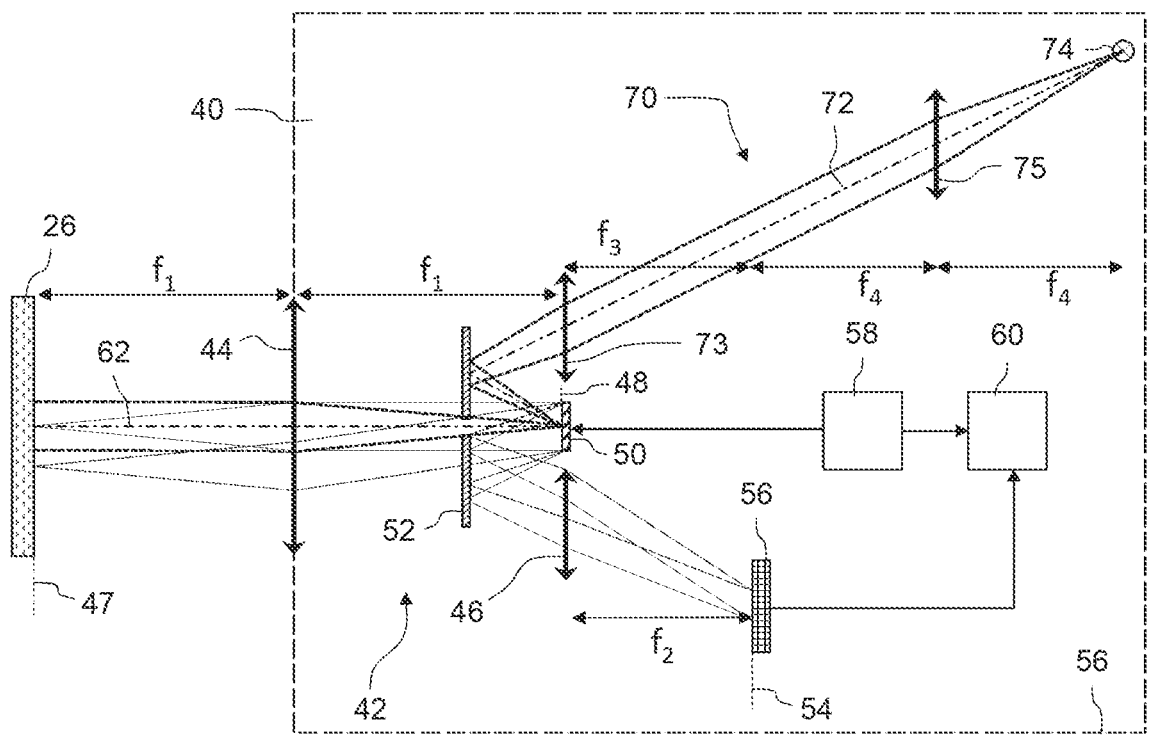
FIG. 2 shows a schematic meridional section through the photogrammetric camera according to an exemplary embodiment of the disclosure.

The sensor 24 contains a photogrammetric camera 40, the optical structure of which is shown in a schematic meridional section in FIG. 2.

The photogrammetric camera 40 has a lens 42 which includes a first partial lens 44 and a second partial lens 46. In the exemplary embodiment illustrated, the partial lenses 44, 46 are each represented by only a single lens element. However, they may each include more than only one lens element.

In FIG. 2, the focal lengths of the two partial lenses 44, 46 are denoted by f1 and f2, respectively. The back focal plane of the first partial lens 44 coincides with the front focal plane of the second partial lens 46. This creates an optical structure denoted a relay optical unit. A relay optical unit is afocal, with the result that parallel light entering the lens 42 leaves the lens 42 again as parallel light. In FIG. 2, marginal rays of the beams emanating from two object points are pairwise parallel.

Relay optical units are telecentric on both sides. This means that both the entrance pupil and the exit pupil are at infinity and the chief rays run parallel to the optical axis both in the object space and in the image space. The object-side telecentricity leads to the important property for photogrammetric cameras that the imaging scale does not change in the case of an axial object displacement. Thus, the image of the object always appears to have the same size independently of the object distance, but naturally it becomes blurry if the object (workpiece 26) is arranged outside of the object plane 47. This is the front focal plane of the first partial lens 44 in the case of a relay optical unit.

In the relay optical unit illustrated, the pupil plane 48 of the lens 42 is at the interface between the two partial lenses 44, 46, which is to say in the back focal plane of the first partial lens 44 and hence in the front focal plane of the second partial lens 46. Light rays entering the lens 42 in parallel pass through the pupil plane 48 at a single point, which is located on the optical axis in the case of axially parallel rays. Conversely, different locations on the object plane 47 are converted to different angles in the pupil plane 48.

Figure 3:
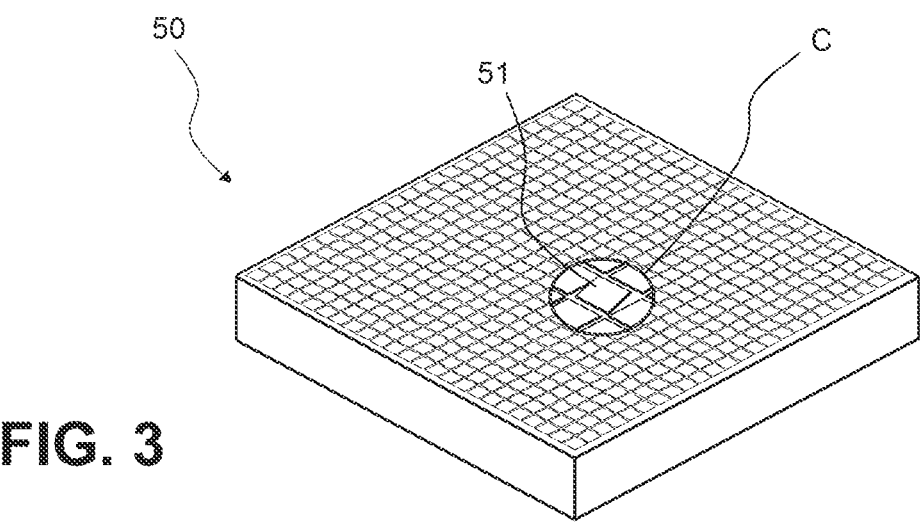
FIG. 3 shows a perspective illustration of a micromirror device which is used in the photogrammetric camera as a variable pupil filter.

A digital micromirror device 50 is arranged in the pupil plane 48 of the lens 42. FIG. 3 shows a perspective illustration of the micromirror device 50. An individual tilted micromirror is identifiable and denoted by 51 in the enlarged detail C. Such micromirror devices are known per se from the prior art, and so more detailed explanations are dispensed with here. By way of example, micromirror devices from the DLP9000 product category by Texas Instruments® are suitable micromirror devices.

The micromirrors 51 of the micromirror device 50 each have two stable tilt positions, where the excursion of the micromirrors 51 is at an angle of +β or −β, with β typically being of the order of approximately 12°. The tilt angle β is approximately 0° if a micromirror 51 is voltage free. The surface of the micromirror 51 then extends approximately parallel to an assembly plane of the micromirror device. However, this neutral tilt position is not defined, and so it is usually not used in applications of the micromirror device—and hence not used in the photogrammetric camera 40 either.

Due to installation space considerations and in order to avoid shadowing, a plane deflection mirror 52 is located in the beam path between the pupil plane 48 and the second partial lens 46. Depending on the dimensions, it may on occasion be advantageous if the assembly plane of the micromirror device 50 is arranged not perpendicular to the plane of the drawing of FIG. 2 but at an angle in relation thereto that differs from 90°. Then, the object plane 47 is likewise tilted according to the Scheimpflug condition; accordingly, the second partial lens 46 is located away from the plane of the drawing of FIG. 2. Beam shadowing can be effectively avoided in this way.

A two-dimensional image sensor 56, which might be a charge-coupled device (CCD) or complementary metal-oxide semiconductor (CMOS) image sensor, for example, is arranged in an image plane 54 of the lens 42.

The micromirror device 50 and the image sensor 56 are controlled by a control device 58. Moreover, an evaluation device 60 is connected to the image sensor 56 and evaluates the images of the workpiece 26 recorded by the the image sensor 56.

The photogrammetric camera 40 further contains an illumination system 70, which can be used to illuminate the workpiece 26. In this case, the optical axis 72 of the illumination system 70 is arranged such that a micromirror 51 in the second tilt position directs the light produced by the illumination system 70 at the workpiece 26.

In the exemplary embodiment illustrated, the illumination system includes two partial systems 73, 75, which are indicated by lens elements and have identical or virtually identical focal lengths $f_3$ and $f_4$, respectively. In this way, it is possible to realize a Kohler-type illumination, in the case of which a light source 74 is imaged via the partial systems 73, 75 into the pupil plane 48 and hence onto the micromirror device 50.

If the light source 74 is in the form of a point light source, as indicated in FIG. 2, then only a small axial region of the pupil plane 48 is illuminated in full on account of the imaging, and this leads to a very targeted illumination of the workpiece 26. If the light used for illumination purposes should have a broader angular distribution, then it is possible to replace the point light source with a surface emitter with a Lambertian emission characteristic. Its dimensions, the focal lengths $f_3$ and $f_4$, the field size and the numerical aperture of the partial systems 73, 75 are typically matched to one another in such a way that the image of the emission surface approximately corresponds to the generally square dimensions of the micromirror device 50.

3. Controlling the Micromirrors

The filter function producible by the micromirror device 50 is digital, which is to say there are only two stable tilt positions. If a micromirror 51 is in a first tilt position, light reflected by the workpiece 26 is reflected by the micromirror 51 in such a way that it can reach the image sensor 56 and hence contribute to the imaging. It is for this reason that the first tilt position is also referred to as "sensor position" hereinbelow. However, a micromirror 51 in the sensor position cannot direct light produced by the illumination system 70 at the workpiece 26.

This is only possible if the micromirror 51 is in the second stable tilt position. Therefore, the second tilt position is abbreviated to "illumination position" hereinbelow. However, in the latter, light reflected at the workpiece 26 is reflected in such a way that it cannot reach the image sensor 56.

The illumination system 70 not only allows the photogrammetric camera 40 to record images of the workpiece 26 but also to illuminate the said workpiece with different illumination angle distributions. All that is necessary to change the illumination angle distribution is to modify the distribution of the tilt positions of the micromirrors 51. Since the illumination beam path from the light source 74 to the workpiece 26 and the illumination beam path from the workpiece 26 to the image sensor 56 use the same pupil plane 48, the pupil function for the imaging beam path cannot be defined independently of the illumination angle distribution. For example, it is not possible to illuminate the workpiece 26 with axially parallel light and at the same time use the image sensor 56 to capture light which was specularly reflected by a surface aligned perpendicular to the optical axis and consequently likewise reflected in axially parallel fashion.

If only substantially axially parallel light is intended to be used to produce an image on the image sensor 56 and hence only the micromirrors 51 in the vicinity of the optical axis 62 are in the sensor position, then this necessarily means that all other micromirrors 51 are in the illumination setting and the workpiece 26 is consequently illuminated with a wide illumination angular range, from which however axially parallel illumination rays are missing.

Should only light leaving the workpiece 26 at a specific angle with respect to the optical axis 62 reach the image sensor 56 for a different image, then the control device 58 controls the micromirror device 50 in such a way that micromirrors 51 located in a ring-shaped region of the pupil plane 48 coaxial with the optical axis 62 are in the illumination position and all remaining micromirrors 51 are in the sensor position. In this case, the radius of the ring-shaped region depends on the desired illumination angle.

Not only does the variable digital pupil filter in the form of the micromirror device 50 require little installation space, but, having approximately 10,000 switching processes per second, it is also extremely fast. As a result, it is possible to produce comprehensive image sequences, which were recorded with different pupil filtering, virtually instantaneously. The illumination can be modified even within the exposure time for a single image. Moreover, the filter function of the pupil filter can be set very accurately on account of the high resolution of approximately 4 million pixels. Since the reflectivity of the micromirrors 51 is almost 90% and the fill factor is above 90%, the optical losses are substantially lower than in the case of LCD panels and their polarization filters.

4. Coaxial Dark Field Illumination

Figure 4:
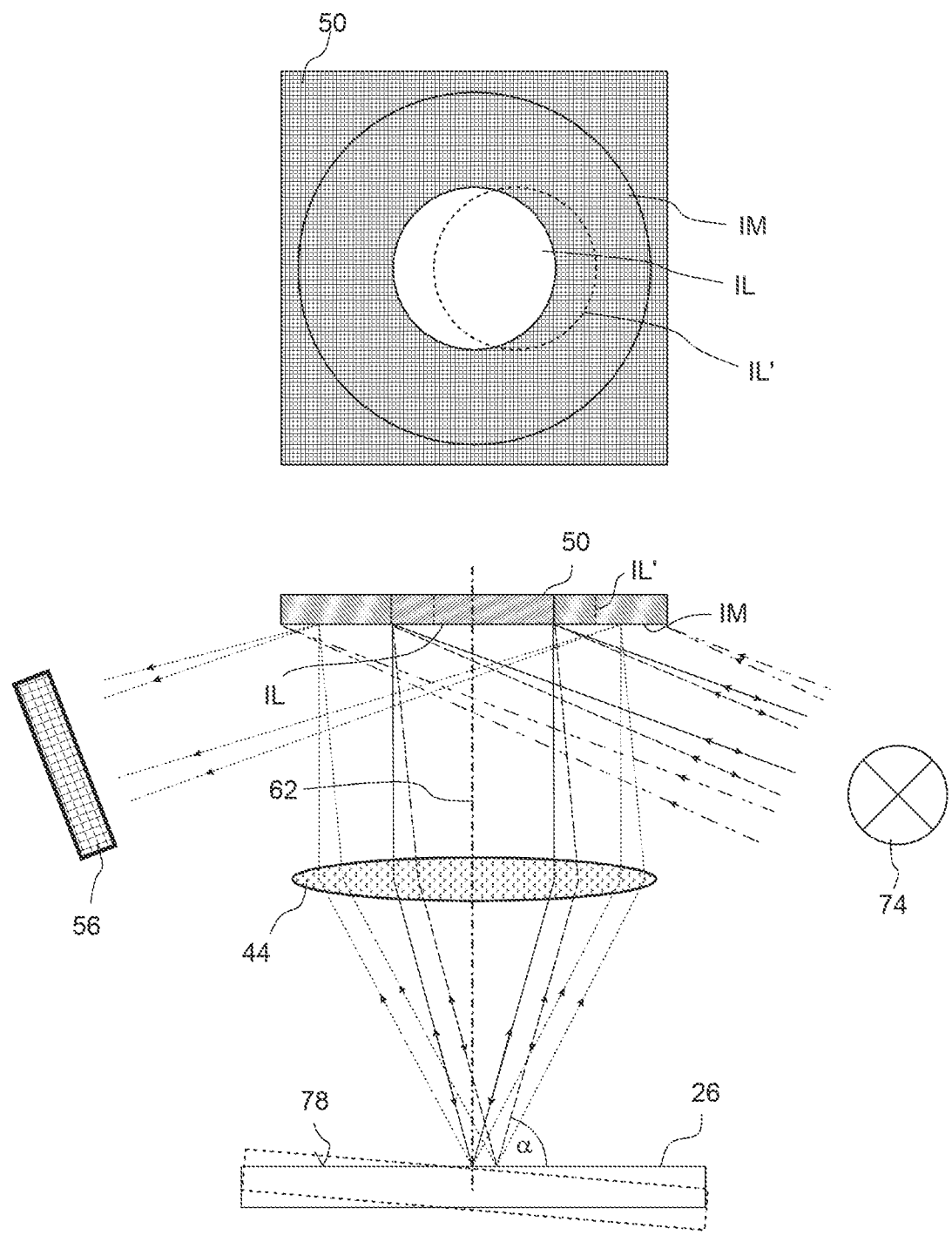
FIG. 4 shows a distribution of tilt positions of the micromirrors in the pupil plane of the photogrammetric camera (top) and a plurality of beam paths of differently reflected light in the case of coaxial dark field illumination (bottom)

FIG. 4 (top) shows a distribution of the tilt positions of the micromirror device 50 of the photogrammetric camera 40, as can be used for recordings with a coaxial dark field illumination. Schematically depicted at the bottom, and not true to scale, are the imaging beam path between the workpiece 26 and the image sensor 56 and the illumination beam path between the light source 74 and the workpiece 26. The two beam paths jointly use the micromirror device 50 and the first partial lens 44.

In the distribution of the tilt positions shown in FIG. 4, all micromirrors 51 within a first region IL in the pupil plane 48 are in the second tilt position (illumination position). The first region IL is point symmetric and has the shape of a circular disc in the exemplary embodiment illustrated.

All remaining micromirrors 51 of the micromirror device 50 are in the first tilt position (sensor position). This also includes those micromirrors located in a second region IM which surrounds the first region IL and has the shape of an annulus in the illustrated exemplary embodiment. No light produced by the light source 74 strikes the micromirrors 51 outside of the second region IM in this exemplary embodiment, since it is implied here that the image of the light source 74 only extends over the two regions IL and IM.

FIG. 4 (bottom) indicates two beam paths using solid and dashed lines. These two beam paths represent light rays which, emanating from the light source 74, are incident on the second region IM, are deflected there in the direction of the surface 78 aligned perpendicular to the optical axis 62 and are specularly reflected at the said surface 78. Consequently, the law of reflection, according to which the angle of incidence equals the angle of reflection, applies to these light rays. Following the reflection at the surface 78 and the renewed passage through the partial lens 44, the light is deflected by the micromirrors 51 in the first region IL, with the result that it returns back to the light source 74. Consequently, this light which was specularly reflected at the workpiece 26 does not contribute to the imaging of the surface 78 on the image sensor 56. Doubly dash-dotted light rays, which emanate from the light source 74 and are incident on the micromirror device 50 outside of the region IM, are incident on the back sides of the micromirrors 51 in the sensor position or are deflected by the latter at such flat angles that these light rays likewise do not contribute to the imaging of the surface 78.

On the basis of the beam path indicated using the dotted lines, it is possible to identify that only light reflected diffusely by the surface 78 reaches the micromirrors 51 in the second region IM which are in the sensor position. Consequently, only this diffusely reflected light makes a contribution to the creation of an image on the image sensor 56. A coaxial dark field illumination is obtained in this way.

If the surface 78 of the workpiece 26 be arranged at an angle, which is to say have a surface normal that does not run parallel to the optical axis 62, then it is necessary for the first region IL to be displaced in the pupil plane 48 by an absolute value that depends on the inclination angle, as indicated in FIG. 4 (top) using a dashed circle IL'. As a result, the light produced by the illumination system 70 is directed at the workpiece 26 at such an angle with respect to the optical axis that the chief ray direction runs perpendicular to the inclined surface 78 and a coaxial illumination is obtained as a result. In that case, the term "coaxial illumination" does not mean substantially axially parallel but perpendicular to the surface.

Figure 5:
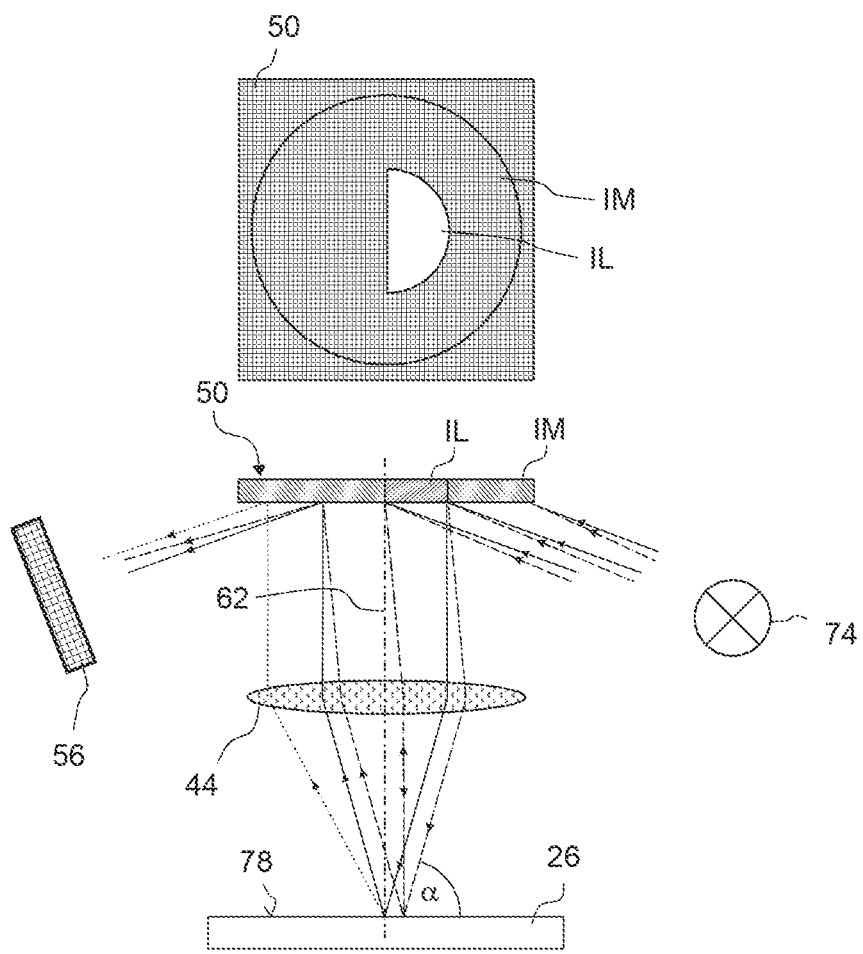
FIG. 5 shows, in an illustration based on FIG. 4, a distribution of tilt positions of the micromirrors in the pupil plane of the photogrammetric camera (top) and a plurality of beam paths of differently reflected light in the case of coaxial reflected light illumination (bottom)

Only selected aperture arrays are shown in FIG. 5. In the illustrated exemplary embodiment, the light produced by the illumination system 70 strikes the surface 78 at different angles α. The angles α are between 70° and 90°, with the result that an angular range of 20° overall is covered.

5. Coaxial Reflected Light Illumination

In an illustration based on FIG. 4, FIG. 5 illustrates a different distribution of the tilt positions of the micromirror device 50 of the photogrammetric camera 40, as can be used for recordings with a coaxial reflected light illumination. Schematically depicted at the bottom, in this case too, are the imaging beam path between the workpiece 26 and the image sensor 56 and the illumination beam path between the light source 74 and the workpiece 26.

In the distribution of the tilt positions shown in FIG. 5, all micromirrors 51 within a first region IL in the pupil plane 48 are in the second tilt position (illumination position). The first region IL is not point symmetric and has the shape of half a circular disc in the exemplary embodiment illustrated.

All remaining micromirrors 51 of the micromirror device 50 are in the first tilt position (sensor position). This also includes those micromirrors located in a second region IM which surrounds the first region IL.

FIG. 5 (bottom) indicates beam paths using solid and dashed lines. These represent light rays which, emanating from the light source 74, are incident on the surface 78 aligned perpendicular to the optical axis 62 and are specularly reflected there. Only light incident on the surface 78 exactly perpendicular is reflected onto itself and does not contribute to the imaging. However, there is a point reflection at the pupil center in accordance with the law of reflection for all other angles of incidence. Since the first region IL is not point symmetric, the specularly reflected light is always incident on micromirrors which are in the second region IM and therefore in the sensor position. Diffusely reflected light, indicated in FIG. 5 using a dotted line, is also predominantly incident on the second region IM and contributes to the imaging. A coaxial reflected light illumination is obtained in this way.

If the surface 78 of the workpiece 26 is arranged at an angle, which is to say has a surface normal that does not run parallel to the optical axis 62, then the first region IL can also be displaced accordingly in the pupil plane 48 in this case.

On account of the non-point-symmetric first region IL, there may be an undesired image offset which is the consequence of the non-telecentric illumination angle distribution. Therefore, n different first regions IL1 to ILn are typically successively produced at different locations in the pupil plane, to be precise in such a way that these different first regions complement one another to form a point symmetric overall region while the image is being recorded. In this way, the workpiece 26 is illuminated with a telecentric illumination angle distribution when averaged over time.

Figure 6A:
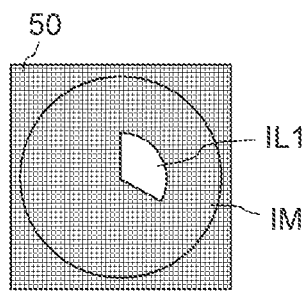
FIGS. 6A to 6C show distributions of tilt positions of the micromirrors at three different times during the recording of an image with coaxial reflected light illumination.
Figure 6B:
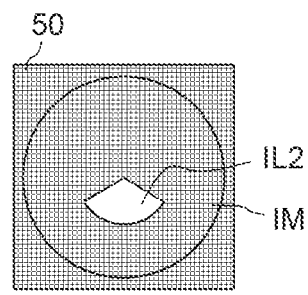
Figure 6C:
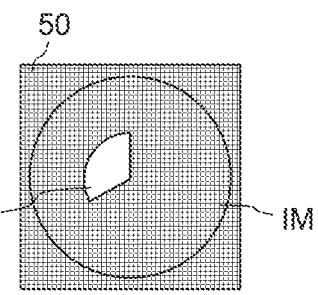

This procedure is illustrated by FIGS. 6A to 6C. During a first time interval $t_1$ over the course of the exposure of the image sensor 56, the first region ILL in which all micromirrors 51 are in the illumination position, has the shape of a circular disc segment which extends over an angular range of 360°/3=120° and has the orientation shown in FIG. 6A. During a subsequent second time interval $t_2$ of the same length, the first region IL2 likewise has the shape of a circular disc segment with the same angular range, but it is rotated through 120°; cf. FIG. 6B. During a third time interval $t_3$ of the same length, the first region IL3 again has the same shape, but it is rotated through a further 120°; cf. FIG. 6C. Over the three time intervals $t_1$, $t_2$ and $t_3$, the first regions IL1, IL2 and IL3 complement one another to make a full circular disc, with the consequence that, averaged over time, a telecentric illumination is obtained and an unwanted image offset is avoided.

It is understood that the foregoing description is that of the exemplary embodiments of the disclosure and that various changes and modifications may be made thereto without departing from the spirit and scope of the disclosure as defined in the appended claims.

What is claimed is:

1. A photogrammetric camera for a two-dimensional measurement of objects, the photogrammetric camera comprising:

an object-side telecentric lens which has a pupil plane;

a two-dimensional image sensor;

a variable pupil filter which includes a micromirror device arranged in the pupil plane and which has a plurality of micromirrors, each of which is transferable into a first stable tilted position and into a second stable tilted position;

an illumination system configured to produce light and direct the light at an object with the micromirror device;

a controller configured to control the micromirror device, wherein a micromirror in the first stable tilted position reflects light produced by the illumination system such that the light cannot reach the object and reflects light reflected at the object such that the light can reach the image sensor, wherein a micromirror in the second stable tilted position reflects light produced by the illumination system such that the light can reach the object and reflects light reflected at the object such that the light cannot reach the image sensor, wherein the object-side telecentric lens has a numerical aperture (NA), wherein, to implement a recording of an image of a surface of the object with coaxial dark field illumination or coaxial reflected light illumination, the controller is configured to control the micromirror device such that the light produced by the illumination system is incident on the surface of the object at different angles within an angular range of at least arcsin (NA)/10, wherein the angular range is between 70° and 90°, wherein to record an image with coaxial dark field illumination, the controller is further configured to control the micromirror device such that all micromirrors within a first region in the pupil plane are in the second stable tilted position and all micromirrors within a second region surrounding the first region are in the first stable tilted position, and wherein the first region is not point symmetric.

2. The photogrammetric camera according to claim 1, wherein the first region has the shape of a circular disc segment.

3. The photogrammetric camera according to claim 1, wherein to record an image with coaxial reflected light illumination, the controller is configured to control the micromirror device such that different first regions are produced successively at different locations in the pupil plane.

4. The photogrammetric camera according to claim 3, wherein k different first regions are produced in succession and each have a shape of circular disc segments with a respective angular range of 360/k°, and wherein the different first regions are oriented such that the different first regions add up to a complete circular disc.

5. The photogrammetric camera according to claim 1, wherein the photogrammetric camera has a deflection mirror arranged in the light path between the micromirror device and the image sensor, and wherein the micromirrors are arranged in an assembly plane which extends at an inclination with respect to a sensor plane in which the image sensor extends.

6. The photogrammetric camera according to claim 1, wherein the controller is configured to successively produce different first regions at different locations in the pupil plane to record the image of the surface of the object.

7. A method for a two-dimensional measurement of objects with a photogrammetric camera, the photogrammetric camera including an object-side telecentric lens which has a pupil plane and a numerical aperture (NA), and which images a surface of an object onto an image sensor, a variable pupil filter which includes a micromirror device arranged in the pupil plane and which has a plurality of micromirrors, each of which is transferable into a first and into a second stable tilted position, an illumination system which produces light and directs the latter at the object with the aid of the micromirror device, a micromirror in the first stable tilted position reflecting light produced by the illumination system such that the light cannot reach the object and reflecting light reflected at the object such that the light can reach the image sensor, a micromirror in the second stable tilted position reflecting light produced by the illumination system such that the light can reach the object and reflects light reflected at the object such that said light cannot reach the image sensor, the method comprising:

producing and directing light at the object with the micromirror device;

to implement a recording of an image with coaxial dark field illumination or coaxial reflected light illumination, controlling the micromirror device such that the light produced by the illumination system is incident on the surface at different angles within an angular range of at least arcsin (NA)/10, wherein the angular range is between 70° and 90°;

storing an image of the surface of the object recorded by the image sensor;

calculating dimensions of structures on the surface based on the stored image of the surface; and to record an image with coaxial dark field illumination, controlling the micromirror device such that all micromirrors within a first region in the pupil plane are in the second stable tilted position and all micromirrors within a second region surrounding the first region are in the first stable tilted position, wherein the first region is not point symmetric.

8. A non-transitory computer-readable storage medium on which a computer program comprising program code is stored, which, when executed on a processor causes the processor to:

produce light with an illumination system and direct the light at an object with a micromirror device;

to implement a recording of an image with coaxial dark field illumination or coaxial reflected light illumination, control the micromirror device such that the light produced with the illumination system is incident on a surface of the object at different angles within an angular range of at least arcsin (NA)/10, wherein the angular range is between 70° and 90°, and wherein NA is a numerical aperture of an object-side telecentric lens;

store an image of the surface of the object recorded by an image sensor;

calculate dimensions of structures on the surface based on the stored image of the surface of the object; and to record an image with coaxial dark field illumination, control the micromirror device such that all micromirrors within a first region in the pupil plane are in a second stable tilted position and all micromirrors within a second region surrounding the first region are in a first stable tilted position, wherein the first region is not point symmetric, wherein a micromirror in the first stable tilted position reflects light produced by the illumination system such that the light cannot reach the object and reflecting light reflected at the object such that the light can reach the image sensor, and wherein the micromirror in the second stable tilted position reflects light produced by the illumination system such that the light can reach the object and reflects light reflected at the object such that said light cannot reach the image sensor.

* * * * *